(12) United States Patent
Guillemont et al.

(10) Patent No.: US 11,110,379 B2
(45) Date of Patent: Sep. 7, 2021

(54) DEVICE FOR SEPARATING AN AIR/OIL MIXTURE

(71) Applicant: SAFRAN TRANSMISSION SYSTEMS, Colombes (FR)

(72) Inventors: Maxence Gérard Claude Guillemont, Moissy-Cramayel (FR); Samuel Raymond Germain Becquerelle, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 100 days.

(21) Appl. No.: 16/718,098

(22) Filed: Dec. 17, 2019

(65) Prior Publication Data

US 2020/0238208 A1 Jul. 30, 2020

(30) Foreign Application Priority Data

Dec. 19, 2018 (FR) ....................... 1873420

(51) Int. Cl.
*B01D 46/26* (2006.01)
*B01D 45/14* (2006.01)
*F02C 7/32* (2006.01)
*F02C 7/06* (2006.01)

(52) U.S. Cl.
CPC ............. *B01D 45/14* (2013.01); *B01D 46/26* (2013.01); *F02C 7/32* (2013.01); *F02C 7/06* (2013.01)

(58) Field of Classification Search
CPC ................................ B01D 45/12; B01D 46/26
USPC .................................................. 55/400, 404
See application file for complete search history.

(56) References Cited

U.S. PATENT DOCUMENTS

| | | | |
|---|---|---|---|
| 6,017,300 A | 1/2000 | Herman | |
| 8,915,991 B2 * | 12/2014 | Foster | F01D 25/16 |
| | | | 95/270 |
| 2004/0214710 A1 | 10/2004 | Herman et al. | |
| 2013/0056407 A1 | 3/2013 | Parikh et al. | |
| 2013/0319240 A1 | 12/2013 | Short et al. | |

FOREIGN PATENT DOCUMENTS

CN 106917655 A 7/2017
FR 3064305 9/2018

OTHER PUBLICATIONS

French Application No. 1873420; Search Report dated Oct. 11, 2019—8 pgs. (In French; relevance found in the citations therein).

* cited by examiner

*Primary Examiner* — Robert A Hopkins
(74) *Attorney, Agent, or Firm* — Lathrop GPM LLP

(57) ABSTRACT

The invention relates to a device (1) for separating an air/oil mixture comprising an air/oil mixture inlet (8), an oil receiving chamber (9), an air circulation duct (11), at least one filter element (21) rotatably coupled to a rotating drive shaft (12), the device (1) being designed so that the mixture from the above-mentioned inlet (8) opens into the chamber (9) and is driven through the rotatably driven filter element (21), so that the oil contained in the mixture is centrifuged radially outside the filter element (21) and fed into the oil receiving chamber (9), the filtered air opening into the air flow line (11), characterized in that the rotating drive shaft (12) is coupled to a turbine (26) capable of being driven in rotation by at least part of the filtered air flow, the turbine (26) comprising an outlet (29) of the filtered flow which opens to the outside.

20 Claims, 3 Drawing Sheets

DEVICE FOR SEPARATING AN AIR/OIL MIXTURE

CROSS-REFERENCE TO RELATED APPLICATION

This application claims priority to French Patent Application No. 1873420, filed Dec. 19, 2018, which is incorporated herein by reference.

TECHNICAL FIELD OF THE INVENTION

The invention relates to a device for separating an air/oil mixture and an accessory box for a turbomachine.

PRIOR ART

Conventionally, an accessory box is a device used to support and mechanically drive other pieces of equipment called accessories, such as electric generators, oil or fuel pumps, or other pumps, necessary for the operation of the turbomachine or the aircraft on which the turbomachine is mounted. To provide such driving, the power required is taken off from a main shaft of the turbomachine, usually through a radial countershaft meshed with the main shaft, to mechanically transmit this power to the accessory box.

The accessory box typically has a stationary casing, in which gears are accommodated to distribute power to the various accessories.

The accessory box may also be combined with a device for separating an air/oil mixture, also known as an oil separator, as known from document FR 3 064 305 on behalf of the Applicant. To do this, air is extracted directly from the air stream of the turbomachine. This air then passes through the turbomachine and is discharged to the outside of the turbomachine to limit the pressure build-up in other areas of the turbomachine. This air, which has passed through different areas of the turbomachine, is loaded with oil used for cooling and lubricating the bearings and pinions of the rotating units. To avoid the discharge of oil-laden air, reduce the ecological impact of turbomachines, reduce oil consumption and limit the filling of oil reserves, it is important to provide devices to separate the oil from the air before discharging the air to the outside of the turbomachine.

FIG. 1 illustrates such a device 1 equipping an accessory box 2. The accessory box 2 has a hollow casing 3 defining an internal volume 4, closed by a cover 5, and containing a set of gears 6 formed by pinions or gear wheels, intended to distribute the power taken from the turbomachine shaft to the various pieces of equipment of the turbomachine. The accessory box 2 has a stationary casing 7, fixed to the cover 5, said casing 7 delimiting an oil/air mixture inlet 8 in the upper part, an annular oil receiving chamber 9 with an oil outlet 10 in the lower part, and a central air circulation pipe or channel 11.

The device 1 also includes a rotating shaft 12 with an X axis, comprising a hollow front part (first part) 13 mounted pivotally in a housing 14 of a front radial wall 15 of the casing 3 and in a central opening 16 of the cover 5, via rolling bearings 17. The front part 13 of the shaft 12 also has toothed pinions 18, here integral with the front part 13 of the shaft 12, meshing with the pinions 6 of the accessory box 2, so that the shaft 12 is driven in rotation.

The terms axial and radial are defined relative to the X axis.

Said shaft 12 also includes a hollow rear part 19 (second part opposite the first part opposite the X axis), widening towards the rear and including an internal annular part 22. The rear end of the part 19 is rotatably coupled, for example by welding, to a cassette 20 supporting filter elements 21. In operation, the rotation of the turbomachine shaft causes the rotation of the shaft 12, part 19 and the cassette 20 with the filter elements 21, around the X axis, relative to the casing 7, the casing 3 and the cover 5.

A mixture of air and oil is fed into the casing 7 through the inlet 8, then passes through the filter elements 21 where oil is separated from air and is extracted radially outwards by centrifugal effect, before being discharged into the oil receiving chamber 9 where it is discharged in the lower part through the outlet 10.

The filtered air that has passed through the filter elements 21 passes through the internal volume of the hollow rear part 19 of the shaft 12, and enters the air circulation channel 11 before being discharged to the outside.

There is currently a need to recover as much energy as possible in order to improve the efficiency of the turbomachine.

The invention aims to provide a solution to this need in a simple, inexpensive and reliable way.

SUMMARY OF THE INVENTION

For this purpose, the invention proposes a flow from an air/oil mixture comprising a flow inlet, an oil receiving chamber, an air circulation duct, at least one filter element rotatably coupled to a rotating drive shaft with a longitudinal axis, the separation device (being designed so that the flow from the above-mentioned flow inlet opens into the chamber (and is driven through the rotating filter element, so that the oil contained in the flow is centrifuged radially outside the filter element and fed into the oil receiving chamber, the filtered flow opening into the air flow line, characterised in that the rotating drive shaft is coupled to a turbine capable of being driven in rotation by at least part of the filtered flow, the turbine comprising an air outlet which opens out.

The turbine thus drives the drive shaft in rotation and the filter element, regardless of the speed of the turbomachine. Indeed, the rotation speed of the turbine, and therefore the efficiency of the filtration, is dependent on the flow of filtered air, and therefore on the filtration needs. In particular, the rotational speed of the drive shaft is mechanically independent of the kinematic chain of the accessory box equipment support, and is therefore independent of the rotational speed of a turbomachine shaft.

Such a structure improves the efficiency of oil and air separation. It should be remembered that the volume flow rate of air to be treated is not only dependent on the operating speed of the turbomachine, but also on the air pressure, and therefore on the altitude.

The terms axial and radial are defined relative to the axis of the rotating drive shaft. The air from the turbine can be released into the atmosphere.

The turbine may have an air inlet, the air flow line having an air outlet, a duct connecting the air flow line to the turbine air inlet so as to direct the filtered flow to the turbine air inlet. The turbine can be a radial turbine, the air inlet of the turbine extending radially, the air outlet of the turbine extending along the axis.

The device may comprise a stationary casing, delimiting the flow inlet and the oil receiving chamber, said casing also delimiting the air circulation line, the rotating drive shaft comprising a first part provided with a free end coupled in rotation to a rotor of the turbine, and a second part opposite the first part opposite the axis, the second part being hollow and supporting the filter element at its radially outer periphery.

A hollow support element can be pivoted relative to the casing in the air flow line, said support element supporting the filter element at its radially inner periphery.

The stationary casing may have an oil outlet located in a lower part of the oil collecting chamber.

The air filtered through the filter element is thus able to flow into the internal volume of the second hollow part of the shaft and is then directed towards the air circulation duct through the hollow support element.

In addition, the oil separated from the mixture flows into the oil recovery chamber and is then extracted from the lower part of the chamber through the oil outlet.

The invention also relates to an accessory box for a turbomachine, comprising a casing housing gear means capable of being driven by a shaft of the turbomachine and capable of rotating at least one piece of equipment, characterized in that it includes a separation device of the aforementioned type, characterized in that the turbine is located axially on a first side of the casing of the accessory box, the air circulation line, the oil receiving chamber and the filter element being located axially on a second side of said casing, the rotating drive shaft of said separating device passing axially through said casing.

The rotating drive shaft is supported by said casing, by means of bearings.

The bearings are, for example, rolling bearings, such as ball or roller bearings.

Such an arrangement allows the accessory box casing to be used as a support means, while having the freedom to place the separation device freely on the casing, since it is independent of the accessory box drive train. This makes it possible to facilitate the integration of the separation device, in particular by reducing the length of the air and/or oil pipes for example. The casing may have a generally bell-shaped part, closed by a radially extending cover.

The rotating drive shaft of the separating device may not have coupling means to the gearing means of the accessory box.

Besides, the invention relates to a turbomachine having an accessory box of the above-mentioned type.

DETAILED DESCRIPTION OF THE INVENTION

Figure 1:
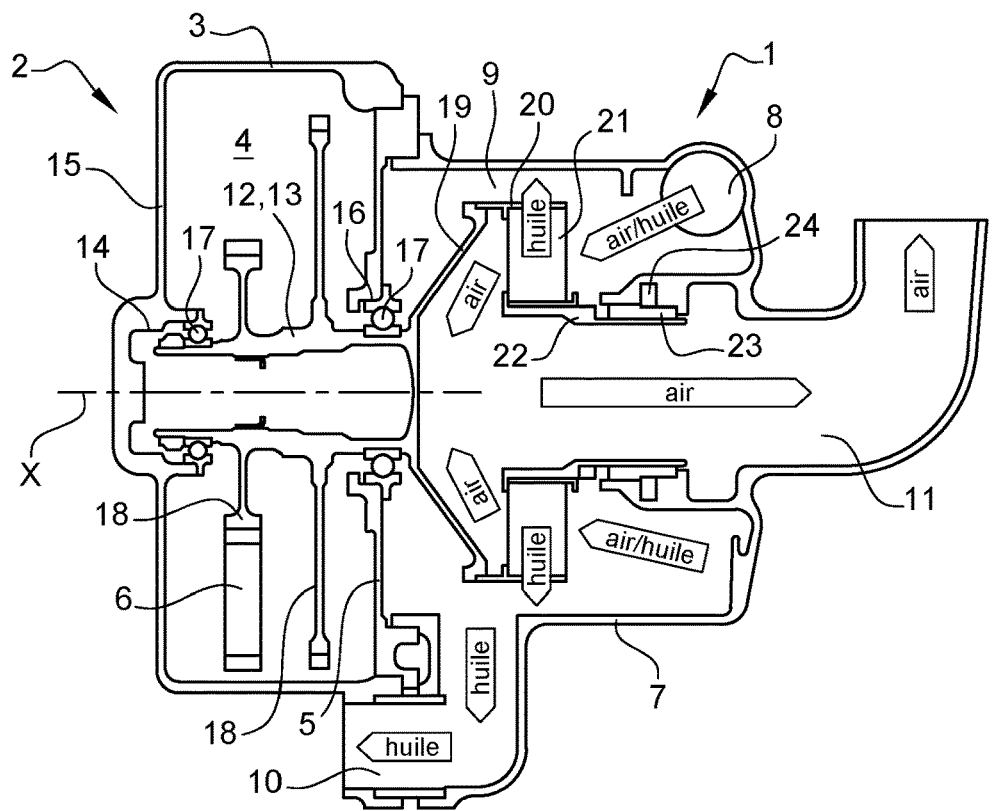
FIG. 1 represents a cross-sectional view of an air/oil mixture separation device provided on an accessory box, in accordance with the prior art.
Figure 2:
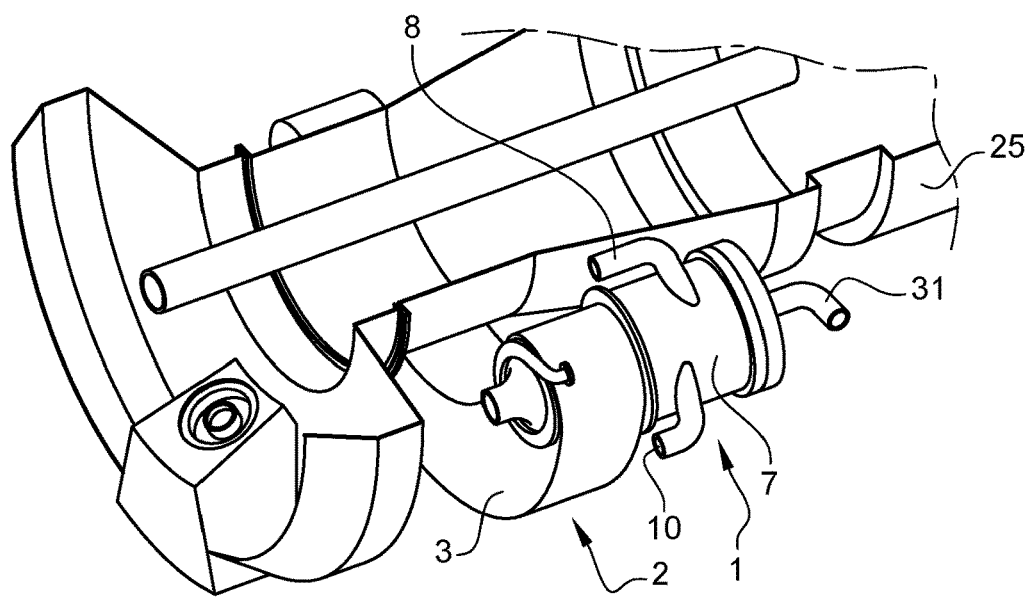
FIG. 2 is a perspective and cross-sectional view of a compressor casing provided with an accessory box and a device for separating an air/oil mixture according to one embodiment of the invention.
Figure 3:
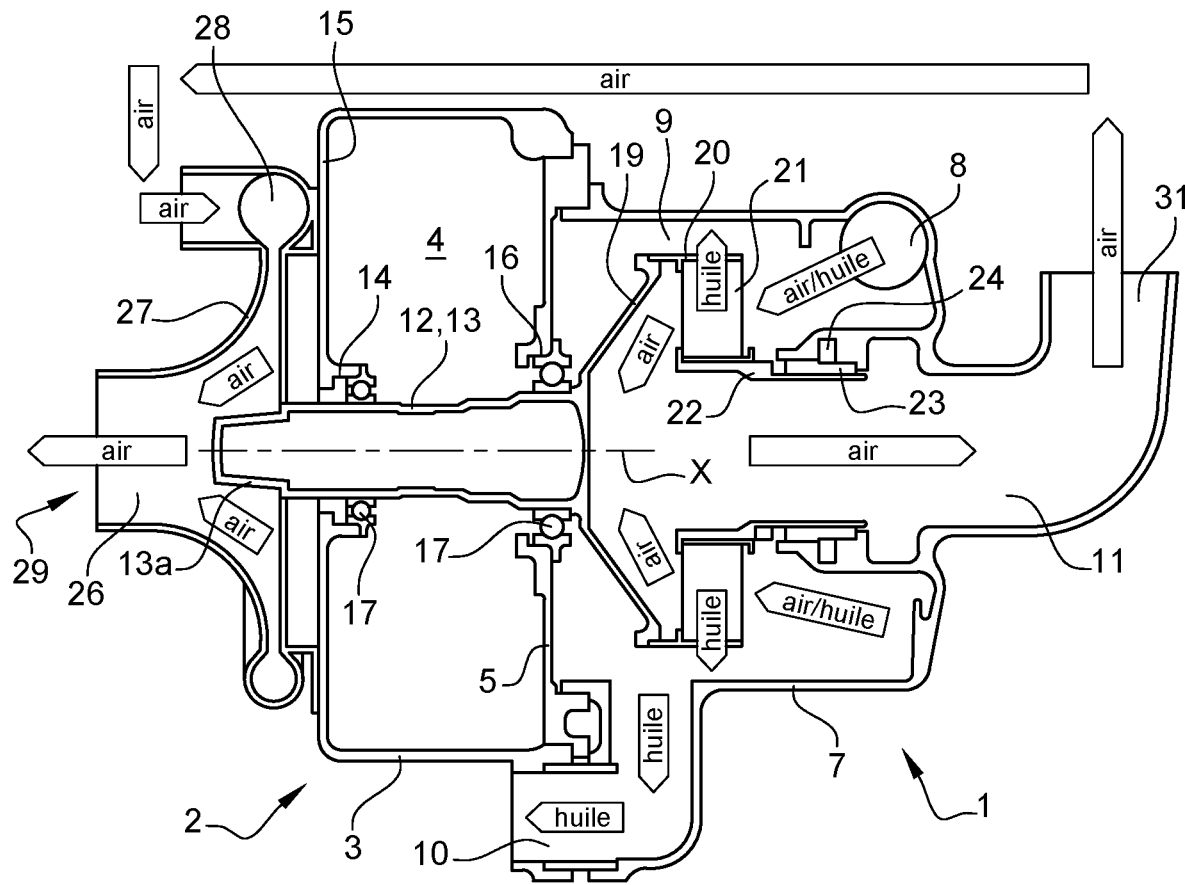
FIG. 3 is a view corresponding to FIG. 1, illustrating a device for separating an air/oil mixture provided on an accessory box, according to the invention.

FIGS. 2 and 3 represent a device 1 for separating an air/oil mixture provided in an accessory box 2, according to one embodiment of the invention.

The accessory box 2 has a stationary casing 3, fixed to a compressor casing 25 and in which are accommodated gears used to distribute power to the various accessories.

The air/oil mixture separation device is also called an oil separator.

As is best seen in FIG. 3, the stationary casing 3 is hollow and delimits an internal volume 4, closed at the rear by a cover 5. The casing 3 contains a set of gears formed by pinions or gear wheels (not visible), intended to distribute the power taken from the turbomachine shaft to the various pieces of equipment of the turbomachine. The accessory box 2 has a stationary casing 7, integral with the cover 5, said casing 7 delimiting an oil/air mixture inlet 8 in the upper part, an annular oil receiving chamber 9 with an oil outlet 10 in the lower part, and a central air circulation duct or channel 11.

The terms high and low are defined relative to gravity. The lower part is thus the part to which the oil migrates by gravity.

The device 1 also includes a rotating shaft 12 with an X axis, comprising a front part 13 pivoted into a housing 14 of a radial front wall 15 of the casing 3 and a central opening 16 of the cover 5, via rolling bearings 17. The front part 13 of the shaft 12 has no pinions meshing with pinions of the accessory box.

The front part 13 of the shaft 12 passes axially through the casing 3 of the accessory box 2 and opens in front of it.

The front is located on the left in FIG. 3, the back is located on the right in this figure.

The terms axial and radial are defined relative to the X axis.

Figure 4:
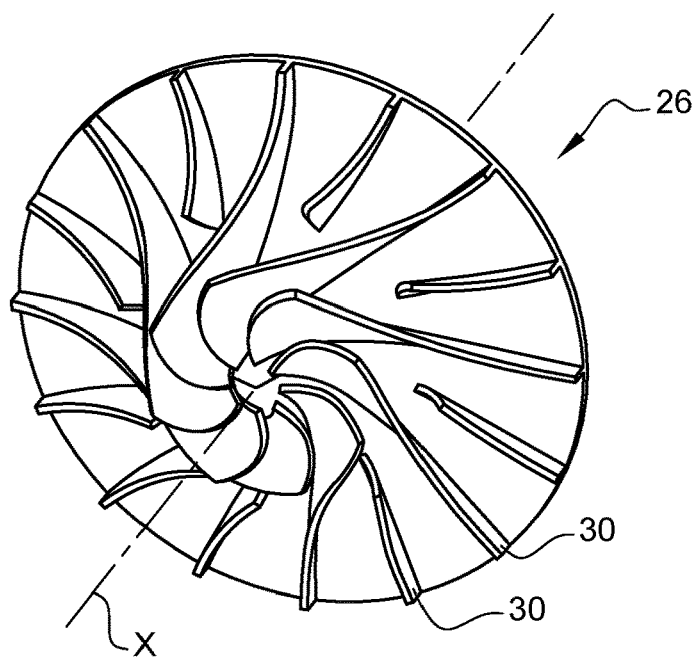
FIG. 4 is a perspective view of the rotor of the turbine
Figure 5:
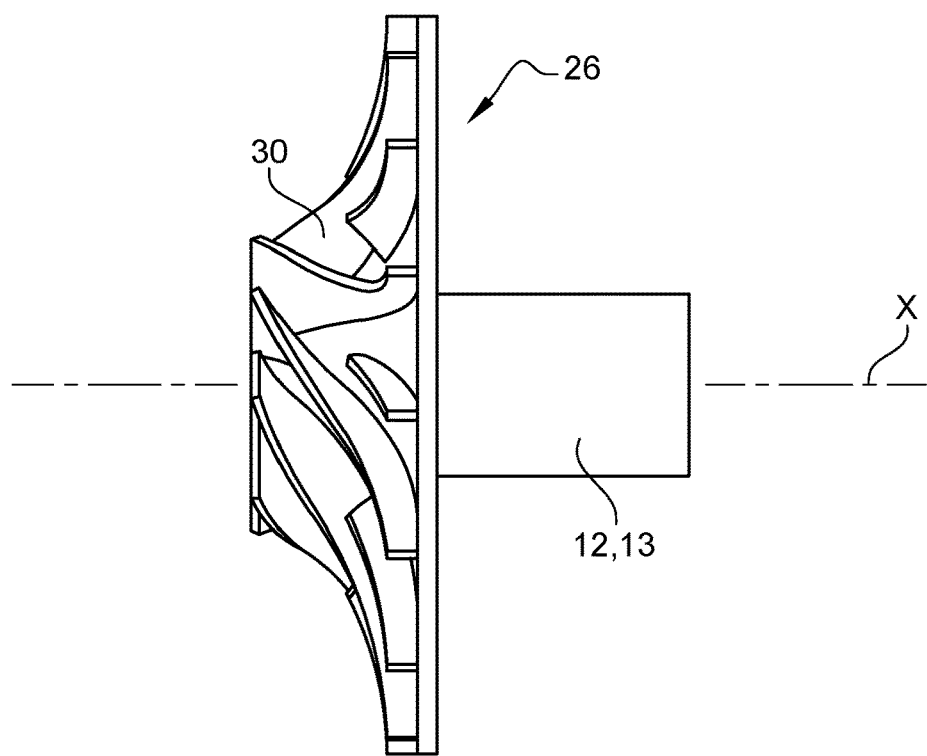
FIG. 5 is a side view of the rotor of the turbine

A turbine rotor 26 is mounted and rotatably coupled to the front end 13a of the front part 13 of the shaft 12. The turbine rotor 26 is associated with a turbine casing 27 to form a radial turbine comprising a radially oriented air inlet 28 and radially located outside the rotor 26 and including an air outlet 29 oriented along the X axis of rotation of the rotor 26. Said rotor 26 has blades 30 or vanes whose shape is better visible in FIGS. 4 and 5.

The outlet 31, i. e. the rear end, of the central air flow channel 11 is connected to the turbine air inlet 28 through an unrepresented pipe.

Said shaft 12 also comprises a hollow rear part 19, widening towards the rear, comprising an internal annular part 22. The rear end of the part 19 is rotatably coupled, for example by welding, to a cassette 20 supporting filter elements 21. The filter elements 21 are for example formed by metal foams, as known in particular from document FR 3 064 305. The radially inner periphery of the cassette 20 is supported by the inner part 22, pivotally mounted on the casing 7, in particular at the central air flow channel 11, by means of sealing means 23, 24.

In operation, a mixture of air and oil is fed into the casing 7 through the inlet 8, then passes through the filter elements 21 where oil is separated from air and extracted radially outwards by centrifugal effect, before opening into the oil receiving chamber 9 where, thanks to gravity, it is discharged into the lower part through the outlet 10.

In particular, the oil drops contained in the air/oil mixture are collected by the filter elements 21 and move towards the radially outer periphery of the cassette 20 due to the centrifugal force resulting from the rotation of said cassette 20 supporting the filter elements 21. Then the oil drops gravitate towards the outlet 10.

The filtered air that has passed through the filter elements 21 passes through the internal volume of the hollow rear part 19 of the shaft 12, and enters the air flow channel 11 before being directed to the turbine inlet 28 through the above-mentioned pipe. This air then drives the turbine rotor 26, which in turn drives the rotation of the shaft 12, the filter elements 21, the ring 20 and the sleeve 22, about the X axis, with respect to the casing 7, the casing 3 and the cover 5.

In particular, air enters the turbine radially from the outside inwards. The shape of the blades and more generally of the turbine rotor 26 makes it possible to transform the kinetic energy of the air flow into a rotational movement of the turbine rotor 26. Since the latter is rotatably coupled to the shaft 12, the rotation of the turbine rotor 26 allows the shaft 12 to be driven in rotation.

The use of filtered air to supply the turbine allows maximum energy recovery to improve the efficiency of the turbomachine.

The invention claimed is:

1. A device for separating a flow from an air/oil mixture comprising a flow inlet, an oil receiving chamber, an air circulation duct, at least one filter element rotatably coupled to a rotating drive shaft with a longitudinal axis, the separation device being designed in such a way that the flow from the above-mentioned flow inlet opens into the chamber and is driven through the rotating filter element, so that the oil contained in the flow is centrifuged radially outside the filter element and fed into the oil receiving chamber, the filtered flow opening into the air flow line, characterized in that the rotating drive shaft is coupled to a turbine capable of being driven in rotation by at least part of the filtered flow, the turbine comprising an air outlet which opens out.

2. A separation device according to claim 1, characterized in that the turbine has an air inlet, the air circulation duct having an air outlet, a duct connecting the air circulation duct to the air inlet of the turbine so as to direct the flow filtered at the air inlet of the turbine.

3. A separation device according to claim 2, characterized in that the turbine is a radial turbine, the air inlet of the turbine extending radially, the air outlet of the turbine extending along the axis.

4. A separation device according to claim 1, characterized in that it comprises a stationary casing, delimiting the flow inlet and the oil receiving chamber, said casing also delimiting the air flow line, the rotating drive shaft comprising a first part provided with a free end rotatably coupled to a rotor of the turbine, and a second part opposite the first part to the axis, the second part being hollow and supporting the filter element at its radially outer periphery.

5. A separation device according to claim 2, characterized in that it comprises a stationary casing, delimiting the flow inlet and the oil receiving chamber, said casing also delimiting the air flow line, the rotating drive shaft comprising a first part provided with a free end rotatably coupled to a rotor of the turbine, and a second part opposite the first part to the axis, the second part being hollow and supporting the filter element at its radially outer periphery.

6. A separation device according to claim 3, characterized in that it comprises a stationary casing, delimiting the flow inlet and the oil receiving chamber, said casing also delimiting the air flow line, the rotating drive shaft comprising a first part provided with a free end rotatably coupled to a rotor of the turbine, and a second part opposite the first part to the axis, the second part being hollow and supporting the filter element at its radially outer periphery.

7. A separation device according to claim 1, characterized in that a hollow support element is pivotably mounted with respect to the casing in the area of the air flow line, said support element supporting the filter element at its radially inner periphery.

8. A separation device according to claim 2, characterized in that a hollow support element is pivotably mounted with respect to the casing in the area of the air flow line, said support element supporting the filter element at its radially inner periphery.

9. A separation device according to claim 3, characterized in that a hollow support element is pivotably mounted with respect to the casing in the area of the air flow line, said support element supporting the filter element at its radially inner periphery.

10. A separation device according to claim 4, characterized in that a hollow support element is pivotably mounted with respect to the casing in the area of the air flow line, said support element supporting the filter element at its radially inner periphery.

11. A separation device according to claim 1, characterized in that the stationary casing has an oil outlet located in a lower part of the oil receiving chamber.

12. A separation device according to claim 2, characterized in that the stationary casing has an oil outlet located in a lower part of the oil receiving chamber.

13. A separation device according to claim 3, characterized in that the stationary casing has an oil outlet located in a lower part of the oil receiving chamber.

14. A separation device according to claim 4, characterized in that the stationary casing has an oil outlet located in a lower part of the oil receiving chamber.

15. A separation device according to claim 7, characterized in that the stationary casing has an oil outlet located in a lower part of the oil receiving chamber.

16. An accessory box for a turbomachine, comprising a casing accommodating gear means capable of being driven by a shaft of the turbomachine and capable of rotating at least one piece of equipment, characterized in that it comprises a separation device according to claim 1, characterized in that the turbine is located axially on a first side of the casing of the accessory box, the air flow line, the oil receiving chamber and the filter element being located axially on a second side of said casing, the rotating drive shaft of said separating device axially passing through said casing.

17. An accessory casing according to claim 16, characterized in that the rotating drive shaft is supported by said casing via bearings.

18. An accessory casing according to claim 16, characterized in that the rotating drive shaft of the separating device is devoid of coupling means to the gear means of the accessory box.

19. An accessory casing according to claim 17, characterized in that the rotating drive shaft of the separating device is devoid of coupling means to the gear means of the accessory box.

20. A method comprising an accessory box according to claim 16.

* * * * *